United States Patent [19]
Glattli et al.

[11] 3,882,895
[45] May 13, 1975

[54] PROGRAM-CARRIER FOR USE IN FLUID-OPERATED PROGRAMMING SYSTEMS

[75] Inventors: Hans-Heinrich Glattli, Kusnacht, Switzerland; Walter Klink, Schmiden, Germany

[73] Assignee: Pneumotech AG, Fallanden, Switzerland

[22] Filed: Mar. 26, 1973

[21] Appl. No.: 345,206

[30] Foreign Application Priority Data
Mar. 30, 1972 Germany............................ 2215672
Mar. 9, 1973 Germany............................ 2311768

[52] U.S. Cl.......... 137/594; 137/533.11; 235/201 R; 235/201 ME
[51] Int. Cl.................... G11b 23/00; G11b 25/04
[58] Field of Search.......... 137/512, 533.11, 533.17, 137/594, 608, 624.11, 624.18; 235/201 R, 201 ME, 201 FS

[56] References Cited
UNITED STATES PATENTS

| | | | |
|---|---|---|---|
| 3,057,375 | 10/1962 | Etter | 235/201 ME X |
| 3,461,279 | 8/1969 | Maurer | 235/201 R X |
| 3,461,435 | 8/1969 | Hoffman | 235/201 R X |
| 3,465,774 | 9/1969 | Kautz et al. | 137/608 X |
| 3,548,849 | 12/1970 | Purcell et al. | 137/608 X |
| 3,602,096 | 8/1971 | Toth | 137/624.18 X |
| 3,658,088 | 4/1972 | Jensen et al. | 137/608 X |
| 3,661,166 | 5/1972 | Dickason | 137/608 X |
| 3,766,940 | 10/1973 | Mason | 137/533.11 X |

FOREIGN PATENTS OR APPLICATIONS
983,950 2/1965 United Kingdom................ 137/594

Primary Examiner—Alan Cohan
Assistant Examiner—Gerald A. Michalsky
Attorney, Agent, or Firm—Michael S. Striker

[57] ABSTRACT

An essentially two-dimensional carrier member, plane or curved with respect to one or more axis outside said carrier member, is provided, as well as a plurality of closure elements. The carrier member is provided with a plurality of fluid passages and both the fluid passages and the closure elements are dimensioned and shaped in such a way that depending on whether said closure elements are inserted or removed, or depending in what axial position said closure elements are contained in said fluid passages fluid flow is free in both directions, blocked in one direction or blocked in both directions. The elements and/or the carrier member are at least in part of elastomeric material.

10 Claims, 12 Drawing Figures

PATENTED MAY 13 1975 3,882,895
SHEET 1 OF 3
FIG.1
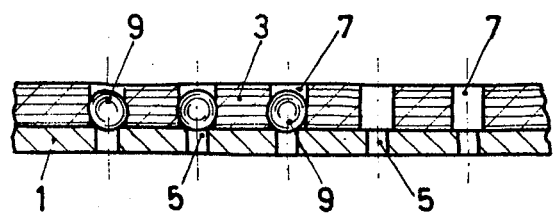
FIG.2
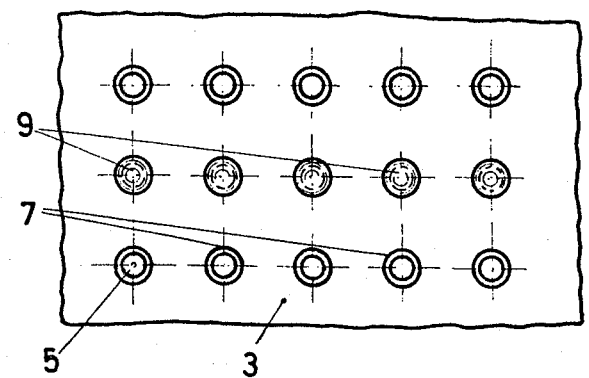
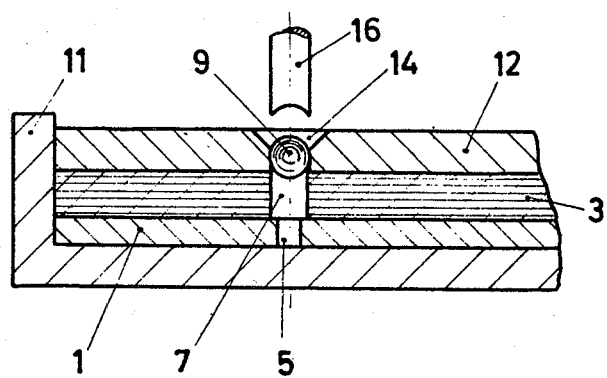
FIG.3

PROGRAM-CARRIER FOR USE IN FLUID-OPERATED PROGRAMMING SYSTEMS

BACKGROUND OF THE INVENTION

The present invention relates generally to program carriers, and more particularly to re-usable program carriers. Still more specially the invention relates to program carriers for use in fluid-operated programming systems.

Many fluid-operated programming systems are controlled by program carriers of one of two types, namely either punched-card or taped carriers, or else so-called cross-bar arrangements. Both of these different types have different advantageous features which, however, are specific to them and could not be combined in a single system heretofore. Punched cards (which term is intended to include tapes) are of course very inexpensive and are in very widespread use as program carriers or information storage devices. Cross-bar arrangements, on the other hand, are capable of being programmed without the aid of any auxiliary devices and in situ. This is to say that punch cards require an auxiliary device in form of a punching apparatus which punches in them the holes that provide the program to be carried out. In cross-bar arrangements this is not necessary and this is of course of considerable advantage in many respects, especially when a program is to be changed because re-programming can be carried out much more quickly than with punch cards.

On the other hand, punch cards have still further advantages beyond those outlined earlier. Naturally, due to their small size and weight they can be readily mailed, they can be stored together with other documents, and they can be readily duplicated. Moreover, unperforated cards are readily obtainable almost anywhere, and the cards of course require much less space than the arrangement in cross-bar systems. In addition, punch cards are potentially ideal program carriers for use in fluid-operated programming systems, whereas cross-bar arrangements can be used in such fluid-operated systems only with difficulty.

Yet, despite the aforementioned advantages punch card controls for programming systems are not widely used. This is not entirely due to the fact that these cards require punching apparatus, because portable apparatus for this purpose is known so that the cards can be punched in situ if and when necessary. One difficulty that is of course experienced in punch cards is the fact that if a mistake is made in punching, the mistake can be corrected only in that the entire punching sequence is begun again. In other words, the punch card having the mistake must be discarded and the program must be punched on a new card. This is of course time consuming, particularly if the mistake has occured only in the last part of the program, so that most of the program has already been punched on the card and must now be discarded. Undoubtedly, this consideration is one of the reasons why punch cards for the control of programming systems have not heretofore been widely used.

An additional reason may be that existing punching apparatus for punch cards do not permit the card being punched to be readily viewed, because the card which is being punched is largely concealed in the apparatus. Thus, a visual control of the part of the program that has already been punched on the card, and of the punching that is in progress, is not possible. Further, these apparatus punch programs on the card in form of columns which is frequently not practical in terms of the control of the programming system itself. The danger of incorrect punching is also a significant factor, expecially in view of the abovementioned particularities of the punching apparatus An attempt has already been made to provide a program carrier of the punch-card type in which a correction can be made if a mistake in punch has occurred. According to British Patent No. 983,950 such a carrier is in form of a plate provided with a plurality of holes which are closed with blockage members, for instance spheres, which members are removed from those holes which are to provide a particular programming signal. Evidently, if an error has occured in that the wrong blockage element has been removed, and if such error is subsequently detected, the error can be corrected simply by restoring the blockage element to its roll and to remove another blockage element. However, this also is an approach that has not been found to be particularly advantageous. A significant disadvantage of this approach is, inter alia, the fact that the blockage element must be retained in the plate serving as the program carrier by adhesives, by hot deformation or the like, which of course requires relatively significant expenditure in terms of time and labor to construct the carrier.

SUMMARY OF THE INVENTION

It is a general object of the invention to overcome the aforementioned disadvantages of the prior art.

More particularly it is an object of the present invention to provide an improved program carrier which avoids these disadvantages.

Still more particularly it is an object of the invention to provide such an improved program carrier which can be readily programmed, checked for accuracy of the programming and corrected if errors are found in the programming.

In addition it is an object of the invention to provide such an improved program carrier which permits its use in a fluid-operated programming system which is controlled with the use of such a program carrier.

Another object of the invention is to provide such a program carrier which can be re-used many times and can be re-programmed if and whenever this is necessary.

Another object is to provide a program carrier of the type in question which is relatively small and can be produced simply and inexpensively.

In addtion, the invention has as a further object to provide such a program carrier which can be read in simple readers.

In keeping with these objects, and others which will become apparent hereafter, one feature of the invention resides in a program carrier for use in fluid-operated programming systems which, briefly stated, comprises a plurality of closure elements, and an essentially two-dimensional, rigid and/or flexible carrier member in the shape of a plate, tape or ribbon, surface of a cone or cylinder etc. At least one of the carrier member and closure elements is at least in part of elastomeric material. The carrier member is provided with a plurality of fluid passages configured for accommodating respective ones of the closure elements in fluid flow blocking position.

The carrier member may be a compound member composed of two or more superimposed and laminated layers, for instance, a metallic carrier plate and a second plate or layer which is of elastomeric material, for instance natural or synthetic rubber.

The program carrier according to the present invention can be readily subjected to visual control during programming, it can be programmed as is required by the particularities of the programming system with which it is to cooperate (it need not be programmed in columns, as in the case of punch cards), and errors in programming can be corrected in a very simple manner. Moreover, the program carrier according to the present invention can be made compatible with systems which can also use conventional punch cards so that conventional punch cards or the program carrier according to the present invention can be used alternatively in one and the same programming system.

The novel features which are considered as characteristic for the invention are set forth in particles in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 1 is a fragmentary section through a program carrier according to the present invention;

FIG. 2 is a top-plan view of FIG. 1;

FIG. 3 is a fragmentary sectional detail view, illustrating a portion of the program carrier in FIG. 1 and of a programming jig therefor;

DESCRIPTION OF THE PREFERRED EMBODIMENTS

Figure 4:
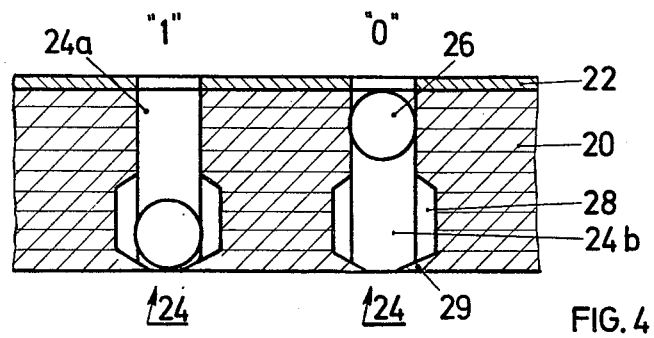
FIG. 4 is a fragmentary sectional detail view, illustrating a further embodiment of the program carrier according to the present invention.

Discussing now the drawing in detail, and referring firstly to the embodiment illustrated in FIGS. 1 and 2, it will be seen that this program carrier is configurated in form of a plate which essentially may have the same format as a conventional IBM or Hollerith punch card. The plate, which will be discussed subsequently in more detail, may advantageously have a thickness of between approximately 1.5 and 2.5 millimeters and be so perforated that its holes — whose diameter may advantageously be between 1.2 and 2 millimeters — have their centers located at such points where in conventional IBM or Hollerith punch cards holes would be punched by the auxiliary equipment provided for the punching. Generally speaking, a total of 480 holes in the program carrier according to the present invention will be sufficient for most applications, with the holes being arranged in 12 lines but only in every other one of the total of 80 columns which are conventional.

FIG. 1 shows that the program carrier in this embodiment is a compound plate having an elastomeric layer or plate 3 which is connected (e.g. by vulcanizing) with a metallic carrier plate 1, for instance of aluminum. Of course, the material of the plate 3 need not absolutely be elastomeric, as long as it is a material which has a sufficient amount of elasticity.

The plate 1 is provided with holes 5 and the plate 3 is provided with holes 7. Each of the holes 7 is coaxial with one of the holes 5 and has a diameter slightly larger than that of the associated hole 5. Some of the holes 7 accommodate and retain closure members, here configurated as balls or spheres 9 and these block the associated holes 5 as illustrated, so that no fluid can flow through them. Of course, the spheres 9 themselves can be made of elastically yieldable material, for instance also of an elastomer, and the purpose of this and of making the plate 3 of an elastically yieldable material is so that the balls 9 will be retained in the holes 7 without the aid of any other means, such as bonding agents or the like. It is of course also possible to use balls 9 of other material, for instance bearing balls, as long as the material of the plate 3 is sufficiently elastically yieldable to retain them.

If the carrier is made of the two plates 1 and 3 as illustrated in FIGS. 1 and 2, then its thickness would be somewhat greater than that of conventional punch cards, namely approximately 4 millimeters. However, the use of such a construction brings with it two very significant advantages. One of these is the fact that the employment of the metal carrier plate 1 assures resistance to deformation, including shrinkage, thus making it possible to choose more freely the materials of which the plate is made. On the other hand, the provision of the metal plate 1 with the somewhat smaller bores 5 assures that when the balls 9 are inserted (for instance manually) or if during the operation of the program carrier in a fluid-operated programming system balls 9 are subjected to significant fluid pressure, they cannot be pushed through the plate 1 because the dimensions of the bores in the metallic plate 1 prevent this. It goes without saying that the diameters of the holes 7 and of the balls 9 must be so coordinated that the balls 9 will be retained in the holes of the plate 3 at least so strongly that they cannot fall out under their own weight (if the open ends of the holes 7 face downwardly) or in case of impacts or the like.

If aluminum is used for the metal plate 1, then the programming schematic can readily be applied on the plate in photographic manner, which of course further facilitates the programming of the carrier.

The thickness of the carrier in FIGS. 1 and 2 is small enough so that it is readily possible to construct a stationary pneumatic reader, that is fluid-operated reader, which permits the use of the novel program carrier. This opens the possibility to fluid-operated "cross-bar" arrangements and to universal controls which can operate with more than one fluid medium.

The programming of the carrier in FIGS. 1 and 2 can be carried out by means of a pusher 16 the lower end portion of which is illustrated in FIG. 3. Other auxiliary aids are not needed, aside of course from the necessary programming instructions. However, the programming can naturally be further facilitated by the provision of a programming jig which is shown in FIG. 3. This jig has a frame 1 into which the program carrier of FIGS. 1 and 2 is placed, with the plate 3 thereof uppermost. A programming template 12 is then placed on top of the plate 3, having holes 14 whose upper inlet ends are bevelled as shown, and which holes are arranged so as to each be precisely coincident with one of the holes 7. The bevelling of the holes 14 facilitates the insertion of the respective balls 9.

Initially, balls 9 are poured onto the upper surface of the template 12, and can be moved about until each of the holes 14 has received one of the balls 9, which is facilitated by bevelling. Thereafter, each thus positioned ball 9 can be pushed through the respective hole 14 into the underlying hole 7 by means of the pusher 16. Naturally it is conceivable to insert all of the balls 9 simultaneously, either pneumatically, hydraulically or mechanically. In the event that a mechanical solution should be favored, it will be appreciated that the pusher used for this purpose must be spring mounted to allow for the possibility that a hole 7 might already contain a ball 9, so that damage could result from the insertion of an additional ball 9 unless the inserting force is limited due to the spring loading of the inserting instrumentality.

It should be mentioned that the elastically yieldable plate of the carrier, that is in FIGS. 1 and 2 the plate 3, should have a minimum thickness corresponding to approximately the radius of the balls 9 if spherical members are used for closure purposes.

Coming to FIG. 4 it will be seen that here the illustrated program carrier is not separate from the spherical closure elements, which are again illustrated as balls designated with reference numeral 26 in this instance. Rather, these balls always remain in the carrier itself.

In FIG. 4 the carrier utilizes a rubber or otherwise elastically yieldable plate 20 which can be employed by itself but advantageously is bonded or vulcanized to a metallic carrier plate 22. The plate 20 is provided with holes or passages 24 each of which is coincident with a similar hole in the plate 22. Unlike the embodiment in FIGS. 1 and 2, the program carrier in FIG. 4 has passages which have different dimensions in different passage sections. In particular, each of the passages 24 has a section 24a whose cross section is circular and somewhat smaller than the diameter of a ball 26, and an additional section 24b whose cross section is greater than the diameter of the ball 26.

In the illustrated embodiment the section 24b is provided with ribs 28 which extend inwardly from the circumferential wall surface bounding the section 24b and which engage the ball 26 when it is lodged in the section 24b, as shown at the left-hand side of FIG. 4. However, because these ribs are circumferentially spaced from one another, fluid can pass between them and around the ball 26 when the latter is lodged in the section 24b. The lower end of the section 24b is provided with a lip 29 which prevents the ball 26 from falling out of the section 24b. The lip or lips can be replaced with an additional carrier plate similar to the plate 22.

In this embodiment each of the holes 24 accommodates one of the balls 26. Programming is affected by either pushing a respective ball 26 into the section 24a or into the section 24b of its passage 24, in dependence upon the particular signal to be conveyed. A pusher 16 can be used for shifting the balls 26. The ball 26 in the left-hand portion of FIG. 4 is located in the section 24, and this may for instance correspond to a signal representing a binary value 1. At the right-hand side of FIG. 4 the ball 26 is lodged in the section 24a of its passage 24, which may for instance correspond to the binary value 0. When the program carrier used in a reader which reads it with the aid of a fluid, the value 1 results in a flow of fluid through the passage 24, whereas a value of 0 does not permit any flow of fluid through the passage 24.

FIGS. 5A–5E show different possibilities for the cross-sectional configuration of the passage section 24b. FIG. 5 shows that three of the ribs 28 may be provided and it will be appreciated that the overall diameter of the passage must of course be larger in the section 24b than the diameter of the ball 26 so that fluid can pass through the section intermediate the ribs 28 and around the ball 26 which is shown in broken lines in FIG. 5A.

Figure 5A:
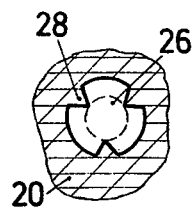
FIG. 5A–5E are fragmentary cross-sectional views illustrating different cross-sectional configuration which the fluid passage of the novel program carrier may have.
Figure 5B:
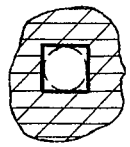
Figure 5C:
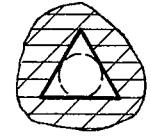
Figure 5D:
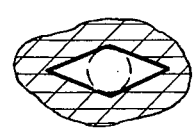
Figure 5E:
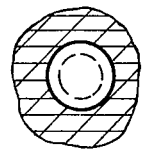

Other geometric configurations for the cross-section of the passage section 24b are also possible, and FIG. 5b shows by way of example a quadratic configuration. In FIG. 5C I have illustrated a triangular configuration and in FIG. 5D a rhomboid configuration. FIG. 5E, finally, shows that the configuration can also be circular and be provided without any ribs, as long as the ball 26 is freely movably accommodated in the section 25b, as will be discussed with respect to the embodiments of FIGS. 6 and 7.

Before discussing these two following embodiments in detail it is pointed out that these balls 26 have a dual function. On the one hand, they serve to open or close the passage, in the manner already described earlier. In addition, however, it is to be noted that those of the balls which are located in the passage section corresponding to the section 24b in FIG. 4, that is in the section in which fluid can flow through the passage and around them, serve to prevent a possible return flow of fluid from other passages of the same row which is being read by the reader and in which similarly a signal representative of the binary 1 is stored. This is important if the reader operates in cross bar-like manner, with the reading fluid being for instance supplied at one side of the carrier to an entire line simultaneously and the carrier being read at the other side over a column of passages.

Figure 6:
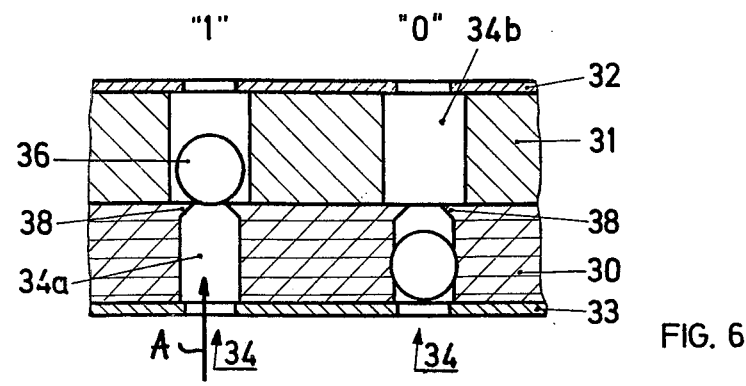
FIG. 6 is a view similar to FIG. 4 illustrating another embodiment of the invention.

With the above comments in mind, and referring now to FIG. 6, it will be seen that here the carrier according to the present invention uses a plate 30 of elastically yieldable material, for instance rubber. There is further provided an intermediate plate 31 which may be connected with the plate 30 and may consist of the same material as the plate 30. Further provided are two carrier plates 32 and 33 which are respectively connected with the plates 31 and 30. Passages 34 are provided which accommodate the balls 36. According to the binary values to be stored, that is either 1 or 0 the balls 36 will either be lodged in the blocking sections 34a or in the flow-permitting passage sections 34b of their respective passage.

Unlike the embodiment of FIG. 4, the embodiment of FIG. 6 provides for the balls 36 to the freely movably accommodated when they are located in the passage sections 34b. In other words, there are no ribs or anything of such nature that could hold the balls 36 in place when they are located in the passage sections 34b. Of course, it is possible to provide such ribs but if they are in fact utilized, they will be configured in such a manner as to merely guide the balls for movement within the passage sections 34b, not to hold them in place.

A sealing lip 38 is provided at the juncture between the passage sections 34a and 34b, here on the plate 30 itself. When one of the balls 36 is lodged in the passage section 34b, as shown at the left-hand side of FIG. 6, and if fluid should flow counter to the reading direction A, that is entering the passage section 34b rather than the passage section 34a, then the ball 36 will be pressed by this fluid against the sealing lip 38, cooperating with the same in the manner of a one-way valve which prevents the further flow of such fluid into the passage section 34a. On the other hand, when reading fluid is admitted in the direction of the arrow A into the passage section 34a, it will lift the ball 36 off the lip 38 so that fluid can pass through the passage section 34b. It is advantageous if the lip 38 is so configured that it can be slightly deformed on contact with the ball 36 when the same is subjected to fluid pressure, so that excellent sealing effectiveness is obtained. This can be achieved by appropriate shaping of the lip 38 and/or by appropriate selection of the material of the plate 30.

Figure 7:
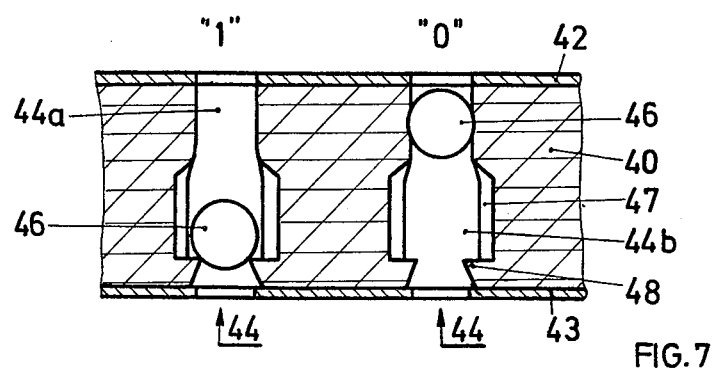
FIG. 7 is a view similar to FIG. 6 but illustrating still a further embodiment of the invention and FIG. 8 is a diagrammatic side view of an additional embodiment of the invention.

Coming to the embodiment illustrated in FIG. 7, it will be seen that here the balls 46 serve the same dual function as in FIG. 6. In FIG. 7 there is provided a plate 40 which may be of rubber or the like and which is located between and connected with two carrier plates 42 and 43 of metallic material. As in all other embodiments, it is possible to eliminate the carrer plate or plates if the plate 40 itself has sufficient structural strength.

The plate 40 is provided with passages 44 each of which accommodates a ball 46 which is either lodged in the blocking section 44a or in the fluid-flow passage section 44b of the respective passage 44, depending upon the binary value to be indicated. In the sections 44b there are provided ribs 47 which, however, do not retainingly engage the balls 46 but only serve for guidance purposes. This is illustrated at the left-hand side of FIG. 7 from which it will be clear that the balls 46 are freely movable in axial direction when lodged in the passage section 44b. A sealing lip 48 is provided by appropriately configurating the plate 40.

It will be appreciated that unlike FIG. 6, the embodiment of FIG. 7 has the advantage that when a ball 46 is moved from the passage section 44a into the passage section 44b, or vice versa, it must not be forced past the sealing lip so that damage or wear of the latter is avoided. However, as in FIG. 6, the sealing lip 48 of FIG. 7 has the same purpose of acting as a one-way valve in conjunction with the associated ball 46. Thus, if a ball 46 is lodged in the passage section 44b as shown at the left-hand side of FIG. 7, and if fluid is admitted properly and for reading purposes from below in FIG. 7, the ball 46 will be lifted off the sealing lip 48 and fluid will be able to pass first through the passage section 44b and then through the passage section 44a. If, on the other hand, fluid should tend to flow in reverse direction, then it will urge the ball 46 against the sealing lip 48 and fluid flow will then be blocked in this reverse direction.

With respect to the embodiments in FIGS. 4–7 it will be appreciated that the balls are of course permanently associated with and retained in the respective carrier member so that they cannot be lost. A separate dispenser in which the balls are stored, and from which they must be removed for programming purposes, as in the embodiment of FIG. 1, is therefore not necessary. Parenthetically — because it will of course be self-evident in any case — it is mentioned that other closure elements besides those of spherical shape could be utilized.

With respect to the embodiments of FIGS. 6 and 7 it is also pointed out that insofar as a reader for reading programs in these embodiments is concerned, there is the significant advantage that the reader need have no separate arrangements for preventing reverse flow of fluids, or diodes or so-called OR-gates, which was previously necessary. This is so because the reverse flow blocking function is now provided by the respective balls in conjunction with the associated sealing lips. This means of course that the reader can be constructed much more simpler than was heretofore the case, and that the two plate units between which the program carrier is located for reading purposes, can be configured identically. Such a reader can be particularly flexible in its use, because it can be readily employed with different types of reading, for instance reading of columns, reading of half columns, reading of whole lines or reading of half lines.

Figure 8:
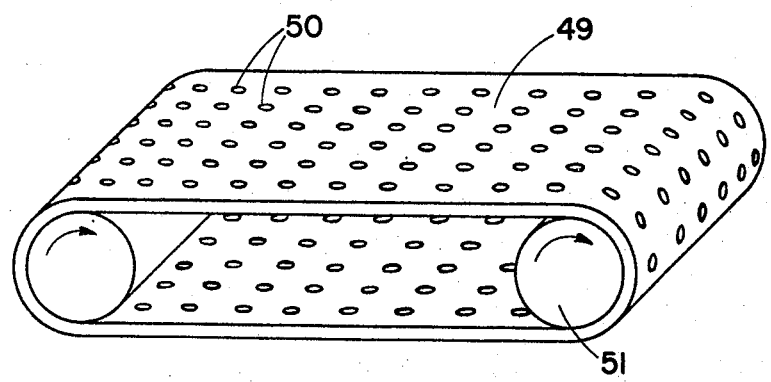

In FIG. 8, finally, we have diagrammatically shown that the carrier member according to the present invention need not be plate-shaped. Here, the carrier member 49 is an endless belt provided with the passages 50 and trained e.g. about the rollers 51. The internal arrangement, relative to the configuration of the passages and the provision of the closure members therein, may be in accordance with one of the preceding embodiments.

It will be understood that each of the elements described above, or two or more together, may also find a useful application in other types of constructions differing from the types described above.

While the invention has been illustrated and described as embodied in a program carrier for use in fluid-operated programming systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An information storage carrier for use in fluid-operated programming systems, comprising a plurality of blocking elements, an essentially two dimensional carrier member, at least one of said carrier member and blocking elements being at least in part from elastomeric material, said carrier member being provided with a plurality of fluid passages configured for accommodating respective ones of said blocking element, each of said fluid passages comprising two axially adjacent passage sections, one of said passage sections having a cross-section slightly smaller than and the other of said passage sections having a cross-section larger than the cross-section of an associated blocking element, so that the blocking element will block the passage against fluid flow when received in said one passage section, and permit flow of fluid through said passage when received in said other passage section.

2. A program carrier as defined in claim 1, wherein all of said elements are identical.

3. A program carrier as defined in claim 1, wherein said elements are spherical.

4. A program carrier as defined in claim 1, wherein said carrier member is a compound member composed of at least two superimposed layers of which one is of elastomeric material.

5. A program carrier as defined in claim 4, wherein the other of said layers is of metallic material.

6. A program carrier as defined in claim 1; further comprising guide ribs projecting from a wall surface bounding the respective second passage section and engaging the associated closure element so as to maintain the latter spaced from said wall surface.

7. A program carrier as defined in claim 1, wherein said closure elements are freely movable within the respective other passage sections.

8. A program carrier as defined in claim 7; and further comprising an annular sealing lip bounding at the juncture of said one and said other passage section an opening whose cross-section is smaller than that of said one passage section, said closure element being lifted out of engagement with said sealing lip by fluid flowing from said one into said other passage section, and being urged into sealing contact with said sealing lip by fluid attempting to flow from said other into said one passage section.

9. A program carrier as defined in claim 1, wherein said carrier member is a compound member composed of at least two layers of which one is of elastomeric material and the other is of metallic material.

10. A program carrier as defined in claim 9, wherein said one passage sections are located in their entirety in said one layer.

* * * * *